March 2, 1954  F. W. SULLIVAN, JR  2,670,573
THERMAL TREATMENT OF CERAMIC OBJECTS
Filed Feb. 13, 1950
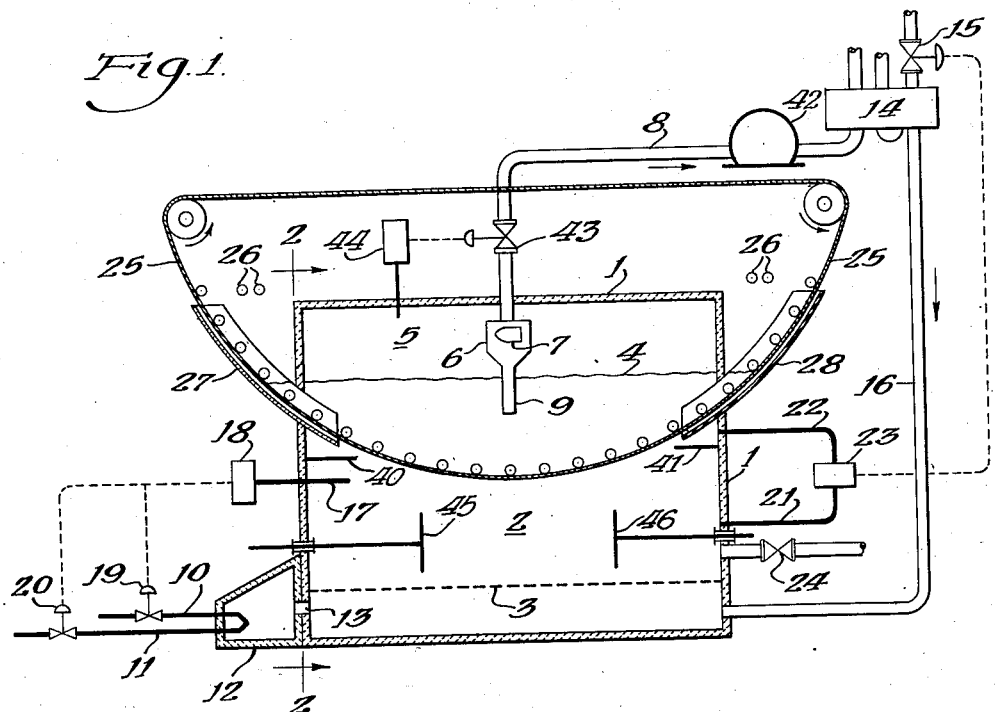
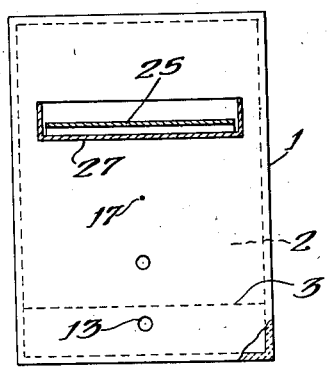
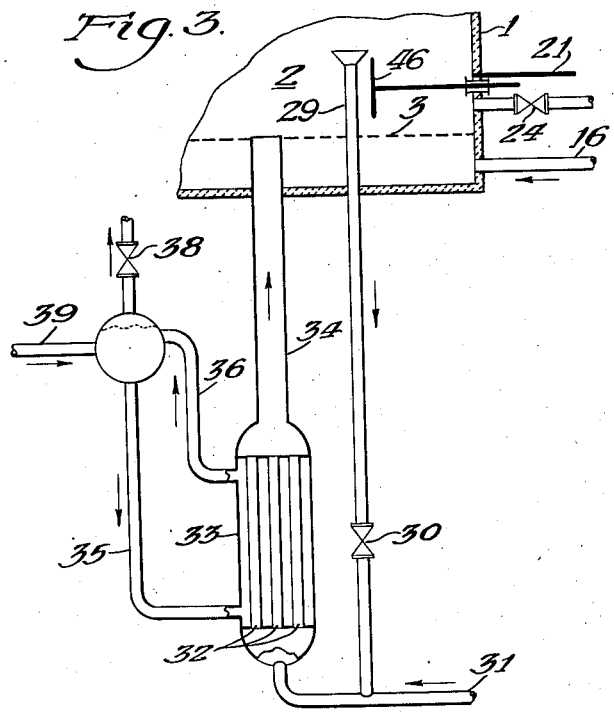
Inventor:
Frederick W. Sullivan, Jr.
By Robert F. Ruth
   Agent Patented Mar. 2, 1954

2,670,573

UNITED STATES PATENT OFFICE 2,670,573

THERMAL TREATMENT OF CERAMIC OBJECTS

Frederick W. Sullivan, Jr., Madison, N. J.

Application February 13, 1950, Serial No. 143,991

10 Claims. (Cl. 49—88)

This invention relates to the thermal treatment of ceramics such as glass, porcelain, enamel and the like.

As is well known, a vitreous ceramic material such as glass exists in the form of a supercooled liquid which, at room temperature, has such a high viscosity that, for all practical purposes, it may be treated as a solid. The viscosity of a newly formed glass object is comparatively low so inherent stresses are rapidly relieved by flow or internal displacement. However, such a newly formed object immediately begins to cool with an accompanying rapid viscosity increase and, as a result, soon the rapid relief of stresses by flow and similar mechanisms becomes impossible. Simultaneously, the cooling sets up a temperature gradient through the object, the interior portions being at a higher temperature than the exposed surfaces, the magnitude of the gradient depending more or less upon the exact shape and size of the object, the rate of cooling, et cetera. As a result, the object "freezes" (as far as the rapid relief of stresses by flow, et cetera, is concerned) under non-uniform temperature conditions. On further cooling, a temperature gradient continues to exist until room temperature is reached following which uniform temperature conditions become established with more or less rapidity. However, since the object was "frozen" under non-uniform temperature conditions, the disappearance of the temperature gradient at room temperature results in the setting up of stresses in the object—longitudinal compression on the surface and tension in the interior. As a result, unless great care is taken in cooling a glass object, breakage usually occurs or, if this is avoided, a very unstable product is frequently obtained. To produce glass with minimum stresses, the newly formed objects must be annealed and then cooled under carefully controlled conditions. These operations are frequently the most difficult and critical of all those involved in the manufacturing procedure.

In general, in the annealing process, the glass is held at a high temperature for a considerable time, the temperature level being such that the viscosity is sufficiently high (e. g. $10^{13}$ poises or a little more) to maintain form but low enough to permit relief of internal stresses to proceed at a very slow but appreciable rate through internal flow and displacement. In most instances, the annealing temperature should be kept as constant as possible. A fluctuating annealing temperature gives rise to many difficulties. If the temperature rises above the proper annealing level, while the relief of internal stresses then proceeds at a faster rate than normal, the glass may undergo plastic flow resulting in distortion or destruction of the desired form. On the other hand, if temperature falls below the annealing level, the rate of relief of internal stresses decreases with extreme rapidity.

Another disadvantage of fluctuating annealing temperatures is that such fluctuations frequently encourage devitrification. While glass is a supercooled liquid, it can crystallize under certain conditions, for example, if it contains a large number of crystallization nuclei and is maintained at the proper crystallization temperature. In general, the maximum rate of nucleus formation occurs at a lower temperature level than that required for maximum rate of crystal growth. A glass can be held at a relatively high annealing temperature, which may coincide with that of maximum rate of crystal growth, for long periods of time without devitrification providing that no great numbers of crystallization nuclei are present. However, if the annealing temperature fluctuates, each drop in temperature brings the glass into the region where rate of nucleus formation is high while the restoration of the temperature to the proper annealing level returns the glass to the region of high rate of crystal growth. It is evident that such fluctuations may result in partial or complete devitrification of the objects.

After annealing, the object is brought to room temperature. Since the object was annealed at a temperature where relief of stresses by flow or internal displacement proceeded at a very slow but appreciable rate, the glass, during the annealing process, was, for all practical purposes, "frozen" under uniform temperature conditions in contrast to the previously described case of uncontrolled cooling from the moment of formation which results in "freezing" under non-uniform temperature conditions. On cooling the annealed glass to room temperature and then reestablishing a uniform temperature throughout the piece, an object is obtained free from stresses. As far as the final results are concerned, the rate of cooling is immaterial, since the operation was begun under uniform temperature conditions and the (practically) "frozen" state and at the conclusion of the cooling operation the same conditions obtain. However, there are certain precautions to be observed. As the temperature is reduced, the outer surfaces of the glass object cool more rapidly than the inner portions, again resulting in a temperature gradient across the glass cross section. This temperature gradient leads to stresses which may become of sufficient magnitude to rupture the object. For this reason the cooling rate must be such that stresses of destructive magnitude, temporary though they may be, are not produced. As previously explained, once the outer surface of the glass has reached room temperature, the hotter interior portions reach the same temperature level with more or less rapidity and the stresses resulting from the temperature gradient set up during the cooling operation disappear.

While the previous paragraphs have described the annealing and cooling of glass as this latter term is generally understood, the same principles apply with respect to ceramics in general, for example, enamels, porcelains, the glazes on pottery, brick and the like, the interparticle glassy binding material in certain refractories and similar articles, et cetera. While it is true that frequently the annealing and cooling of ceramics (as distinguished from glass) can be accomplished satisfactorily with comparatively little control of the process, yet the annealing and cooling of some ceramic materials, for example, enamels, especially enamels on metals, porcelains, the glazes on high quality whitewares and the like, require rigid control for satisfactory results.

The principal object of my invention is to provide improved methods and means for the thermal treatment of vitreous silicates.

Another object of my invention is to provide improved methods and means for annealing vitreous silicates.

A further object of my invention is to provide improved methods and means for cooling vitreous silicates.

An additional object of my invention is to provide improved methods and means for annealing glass.

Yet another object of my invention is to provide improved methods and means for cooling glass.

A further object of my invention is to provide improved methods and means for opalizing glass.

An additional object of my invention is to provide improved methods and means for tempering glass.

Other objects of my invention will become apparent as the description thereof proceeds.

In its broadest aspects, my invention embraces methods and means for the controlled thermal treatment of vitreous ceramics wherein accurate control of the application or abstraction of heat is secured through the agency of finely divided solids in pseudoliquid form. By the methods and means hereinafter described in detail, such operations as the annealing, cooling, tempering, opalizing, et cetera, of ceramics can be controlled more accurately than has hitherto been possible.

For the better understanding of my invention, reference may be had to the accompanying sheet of drawings, forming a part of this specification, and wherein:

Figure 1 is a diagrammatic representation, largely in section, of one form of apparatus suitable for carrying out the process of the instant invention;

Figure 2 is a diagrammatic sectional view across plane A—A of Figure 1, and

Figure 3 is a diagrammatic sectional representation of a modified form of a portion of the apparatus of Figure 1.

Turning now to a more detailed consideration of Figure 1, reference character 1 indicates a receptacle, preferably of rectangular cross section but which may be, however, of any convenient size and shape, in which a bed 2 of finely divided solids in pseudoliquid form is maintained. The bed is supported by perforated grid 3 and the upper level of said pseudoliquid bed is generally indicated by 4.

On passing a gas upward through a bed of finely divided solid particles, for example, particles passing through a 100 mesh sieve but retained on a 400 mesh sieve, a point is reached at a superficial linear gas velocity of about one foot per second, more or less, at which the solid particles assume a pseudoliquid state. When in this state, the bed of solid particles exhibits most of the properties of a classical liquid, that is, it will flow by gravity, can be pumped, exerts hydrostatic pressure, and the like. The pseudoliquid body develops a well defined, highly turbulent upper surface 4 which has the physical appearance of a violently boiling liquid.

Since in the process of my invention high temperatures are employed, receptacle 1, grid 3, the solid particles of bed 2 and other portions of the apparatus which will be readily apparent as the description proceeds, must be capable of withstanding such temperatures. To this end, receptacle 1 may consist, for example, of an insulated steel shell lined with suitable refractory brick while grid 3 may be made from stainless steel or similar high temperature alloy.

The gas space 5, above the surface of the pseudoliquid bed 4, consists of more or less finely divided solid particles suspended in the gas that has passed through bed 2. To clean this gas and recover these solids and return them to the pseudoliquid bed, the suspension enters a conventional cyclone separator 6 through tangential inlet 7, clean gas leaving by 8 and recovered solids returning to the bed 2 through dip leg 9. The material of the cyclone is of course capable of withstanding the high temperatures that prevail. Other suitable means may be employed in place of or in conjunction with cyclone 6 to separate suspended particles. Among such substitute or supplementary devices may be mentioned electrostatic precipitators and porous ceramic or porous metal filters.

The necessary amount of gas to maintain the solid particles in pseudoliquid form is introduced through the perforations in grid 3. To maintain the high temperature conditions required for the processes of this invention, the amount of heat necessary to replace that lost through radiation and other causes is conveniently added by means of this gas. Thus, gas in line 10 and air in line 11 may be mixed and burned in furnace setting 12 and the resulting combustion products passed to receptacle 1 through orifice 13. To further conserve heat, a portion of the gases in line 8 may be passed through a high temperature blower (not shown) and returned to receptacle 1 at a point below grid 3. However, due to the high temperature levels that prevail and the erosive action of traces of solids that escape recovery in cyclone 6, much blowers are not too satisfactory and it is more convenient to preheat air with discharged gases and pass the thus preheated air to the unit. To this end, the stream in line 8 is passed through air preheater 14 which may be of any desired type, conveniently of the regenerative type and preferably of the rotating regenerative type. Air, compressed to the necessary degree, passes through valve 15, preheater 14 and thence by line 16 to receptacle 1. If desired, a portion of this preheated air may be sent by a line (not shown) to supply the burner in furnace 12, thereby greatly increasing the efficiency of the resulting combustion process.

The temperature in bed 2 is very uniform. Although heat is added by means of the gas supplied through grid 3 and heat is lost by radiation and similar effects, the temperature variation from point to point in the violently turbulent bed is practically zero. Just as the temperature of a body of rapidly boiling water is practically uniform throughout, in spite of the fact that heat is being supplied through some surfaces and lost through others, so here, in the violently turbulent bed 2, thermal conditions are very nearly uniform.

The temperature level in bed 2 may be maintained at any desired point by manual control but preferably automatic means are employed. To this end, thermocouple 17 in bed 2 actuates temperature controller 18 which in turn manipulates valves 19 and 20 in lines 10 and 11. As the temperature measured by 17 rises above the setting of controller 18, this last actuates valves 19 and 20 and thereby the fuel and air input to furnace 12 is somewhat reduced. On the other hand, if the temperature of bed 2 falls below the controller setting, the opposite occurs.

Likewise, while the amount of air added through 16 may be regulated manually, it is preferably controlled automatically. Taps 21 and 22, placed across a vertical section of bed 2, measure the pressure difference over said section. Differential controller 23 actuates valve 15 and this increases or decreases the flow of air therethrough as required to maintain a constant pressure differential over the section, thus maintaining bed density constant.

Valved line 24 serves to remove or replace solid particles in receptacle 1 as conditions demand.

My apparatus can be employed in the continuous annealing of production items or the intermittent annealing of special items. For continuous annealing, a production item, e. g. a parison or bottle blank may, from the "take out" position be loosely inserted in holes in an endless chain conveyor which is moved mechanically through the pseudoliquid bed of solid particles at such a rate that the objects are annealed in accordance with the principles set forth previously. This may be accomplished, for example, by passing the endless conveyor 25 carrying the objects 26 into dip leg 27 leading to bed 2. The conveyor and its load moves through bed 2 at a rate necessary to anneal the objects supported thereon, the exact rate being extremely variable, being a function of the composition of the glass, the size and shape of the objects, temperature and many other factors. The conveyor and the supported annealed pieces leave bed 2 through dip leg 28 and are then cooled, either by being passed through a suitable lehr (not shown) while still supported on the chain conveyor or by being transferred from the chain conveyor to a suitable supporting means which is then placed in the cooling lehr.

Dip legs 27 and 28 are preferably rectangular in cross section and of any convenient width consistant with the dimensions of receptacle 1. The vertical clearance within dip legs 27 and 28 is sufficient to accommodate the endless chain conveyor 25 and the objects 26 supported thereby. Figure 2 is a vertical sectional view of a typical dip leg in its appropriate environment.

The outside ends of dip legs 27 and 28 discharge little or no gas and finely divided solid particles to the air. It will be noted that the ends of dip legs 27 and 28 that are within bed 2 are vertical and this tends to prevent the entry of gas from the stream rising through the bed. The possibility of such entry of gas can be further reduced by mounting baffle plates 40 and 41 below the ends of dip legs 27 and 28 in bed 2 to the deflect the stream of rising gas away from the open ends thereof. Escape of finely divided solid and gas from the outside ends of dip legs 27 and 28 can be entirely prevented by maintaining a slightly reduced pressure in space 5. This may be accomplished, for example, by placing a high temperature blower 42 in line 8, the feed to said blower being governed by a valve 43 placed in line 8 between the blower and cyclone 6. The degree of opening of the valve is automatically varied through a pressure controller 44 which operates responsive to pressure changes in space 5. This pressure controller may be set at a value somewhat below atmospheric pressure and opens the valve in line 8 further or closes it slightly as the pressure in 5 rises above or falls below the setting of the controller.

While the continuous annealing of production items may be accomplished as above described or by other suitable variations which will now be apparent to those skilled in the art, frequently continuous annealing is impractical. Thus, if one or a relatively few number of each of a large variety of shapes are being produced it may be impractical to make the large number of changes necessary in the size and/or spacing of the perforations in the endless chain conveyor 25 to accommodate the various items to be annealed. Also, with some materials, the annealing time is so long that a ocntinuous annealer for the purpose would be of impractical size. Thus, certain optical glasses are annealed for a period of two or three weeks.

For reasons previously given, a practically constant annealing temperature is easily maintained in a bed of finely divided solid particles in pseudoliquid form. Some of the advantages of a constant annealing temperature have already been enumerated. However, in a few instances, treatment of glass under fluctuating temperature conditions is desirable and this is also easily accomplished. In the manufacture of opalescent glass it is desirable to produce a product which disperses a transmitted ray as much as possible and at the same time exhibits minimum absorption. Such a desirable product is best made by incorporating myriads of microscopic crystals of, as nearly as possible, uniform size in the glass. To produce such a material, a special melt is employed exhibiting nucleus forming and crystallization curves that are not superimposed or are superimposed to only a limited extent. The melt contains an opalizing ingredient such as calcium phosphate, fluorspar, cryolite, zinc oxide, aluminum oxide, tin oxide or the like. Objects made from such a glass are maintained at the relatively low elevated temperature conducive to rapid production of crystal nuclei but, due to the fact that this temperature is entirely below the range necessary for crystal growth, the nuclei do not grow. When a sufficient number of such nuclei have formed, the glass is brought to a relatively high elevated temperature where maximum rate of crystal growth is obtained and when the nuclei have grown to the proper size, the objects are cooled as usual. Since the relatively high elevated temperature is above that required for nuclei production, no additional nuclei are produced during the crystal growth operation. Obviously, if such nuclei were produced during this operation, they would also grow to an extent dependent upon the time elapsing from that of their formation to the removal of the object from the crystallization temperature range, which would result in the formation of crystals of varied size, thus defeating to a greater or lesser extent the objects of the process.

It is evident that the apparatus of my invention is ideally suited to the production of such opalized glass. To promote nuclei formation, bed 2 is maintained at a relatively low elevated temperature by reducing the amount of combustion gas introduced through 13 and/or by partially or completely bypassing air preheater 14. When nuclei formation has proceeded to the desired extent, the temperature is increased by obvious means to that necessary for crystal growth and when such growth has proceeded to the desired extent, the objects are removed and cooled following which the bed temperature is reduced to that necessary for nuclei formation. This cooling may be accelerated by any one or any combination of a variety of methods. Among these may be mentioned (a) reduction or elimination of the fuel-air mixture supplied to furnace 12, (b) bypassing part or all of the air around preheater 14, (c) direct injection of a cooling medium (e. g. water or steam) into bed 2 through a suitable valve (not shown) and (d) indirect cooling of the solid particles in bed 2. Indirect cooling of the solid particles in bed 2 may be accomplished, for example, as shown in Figure 3. Here, solid particles from bed 2 are drawn off through standpipe 29, the rate of withdrawal being controlled by valve 30. Air enters through line 31, picks up the solid particles emerging through valve 30 and then moves them through the tubes 32 of cooler 33. After passage through cooler 33, the particles are returned to bed 2 via line 34. The tubes 32 of cooler 33 are surrounded by water supplied by line 35. A mixture of water and steam leaves the shell side of cooler 33 by line 36 to steam disengaging drum 37. Steam is eliminated through line 38 and makeup water is added through line 39.

If continuous operations are desirable in the production of opal glass, two units similar to that shown in Figure 1 are employed, one of which is maintained at the relatively low elevated temperature for nuclei formation, the second at the relatively high crystal growth temperature. The glass objects first pass through the bed at the relatively low elevated temperature and then through the hotter bed.

The same principles apply in the manufacture of colored glass of the type in which color is due to particles of colloidal size dispersed in the glass. A suitable coloring agent, e. g. gold chloride, cadmium sulfoselenide or cuprous oxide is incorporated in the melt. To develop color in objects made from such melts, these are held at a relatively low elevated temperature suitable for the genesis of nuclei of subcolloidal size following which the object is brought to a relatively high elevated temperature and the nuclei are allowed to grow by agglomeration until the desired color has developed.

The desirability of annealing under conditions of zero temperature gradient in the object has been emphasized. However, here again, for certain limited applications, it is desirable to "freeze" the object while a temperature gradient of controlled magnitude exists through the glass section. Glass breaks as the result of the application of surface tension stresses above a certain critical magnitude. However, if the surface is already subject to longitudinal compressive stresses, these tend to neutralize any applied tension stresses which, with ordinary glass, would result in breakage. Accordingly, varieties of glasses with the surface under longitudinal compression are stronger than ordinary glass. However, when such glasses do break, rupture is complete and a large part or all of the object may disintegrate into powder (compare Prince Rupert's drops). Since breakage does not give rise to the jagged pieces that result on rupture of ordinary glass objects, such "tempered" glass is not only of extraordinary strength but is also relatively safe. The breakage pieces are tiny polyhedra with truncated corners and are relatively innocuous. Frequently, on breaking tempered glass, the object retains its shape but is permeated by myriads of fracture planes. Such tempered glasses have several rather limited but very important applications.

The process of my invention is eminently suited to the production of tempered glass. The objects are held at a high annealing temperature, in a pseudoliquid bath if desired, whereby all stresses are relieved by internal flow or displacement under conditions of constant temperature throughout the object. The glass is then immediately plunged in pseudoliquid bath 2 which is heated to a low temperature, a temperature gradient thus being established through the glass section. The object is accordingly "frozen" under non-uniform temperature conditions and is then cooled to room temperature. When the surface of the glass object reaches that of the room, the object is substantially stress free due to the temperature gradient that still exists. However, as the hotter interior portions of the glass also cool to room temperature, stresses are set up—tension in the interior and compression on the surface.

The temperature level of pseudoliquid bed 2 into which objects heated to a high annealing temperature are plunged for tempering purposes is largely a function of the expansion coefficient of the glass being processed. The temperature is lower, the lower the coefficient of expansion of the glass. By use of pseudoliquid bed 2, any desired cooling rate within reason may be achieved, uniform cooling is obtained and after cooling, the objects do not require cleaning as is the case when molten salt or oil baths are employed for the purpose.

The finely divided solid particles of bed 2 may be of any conveniently available material capable of withstanding the temperatures encountered. Finely crushed sand, magnesia, graphite, high melting silicates such as asbestos and clays, and the like may be employed.

Finely divided carbon may also be used to form the bed and with this material electrical heating is possible by means of suitable electrodes 45 and 46 immersed therein. Also, when carbon is used, the bed may heat itself by autogeneous combustion. Obviously, on passing air through a deep bed of carbon particles in pseudoliquid form, combustion occurs in the lower portions with the production of carbon dioxide which is reduced to carbon monoxide on continuing to pass upward through the bed. When operating in this manner, producer gas leaves through line 8 and may be used as a combustion gas in other operations. Furthermore, since most commercially available forms of finely divided carbon (e. g. metallurgical coke) contains more or less ash, the bed solids must be purged continuously or intermittently at frequent intervals at such a rate as to avoid an undue accumulation of ash in the bed. The bed may be purged, if desired, through valved line 24. When operating in this manner a strongly reducing atmosphere exists in bed 2 and hence care must be taken that the glass is not adversely affected thereby. Some glasses, e. g. high lead glasses, are quite sensitive to reducing agents.

It should be noted that once a pseudoliquid bed of finely divided non-combustible solid particles is at elevated temperature such as employed in the processes of the present invention, the desired elevated temperature may be maintained by combustion occurring within the bed itself. Thus, a suitable gaseous or liquid fuel may be introduced directly into the hot, pseudoliquid bed through a line (not shown) and burned, for example by the air supplied through line 15. Since it is difficult or impossible to maintain combustion in a pseudoliquid bed of cold finely divided solid particles, to heat such a cold bed an external source of heat, such as furnace 12, must be employed and obviously this can be used subsequently to maintain the bed at the proper temperature as has been explained previously.

Be it remembered, that while the present invention has been described in connection with several specific embodiments and examples thereof, these are illustrative only and in no way limit the scope of said invention except as these may be included in the accompanying claims.

I claim:

1. In the thermal treatment of glass objects, the step including immersing said objects in a heated bed of solid particles in pseudoliquid form.

2. In the annealing of glass objects, the steps including immersing said objects in a bed of solid particles in pseudoliquid form at annealing temperature and maintaining the objects in said bed for a time sufficient to establish a uniform temperature throughout the sections of said objects and to relieve the stresses therein.

3. In the thermal treatment of vitreous silicate objects, the step including immersing said objects in a heated bed of solid particles in pseudoliquid form.

4. In the thermal treatment of vitreous ceramic objects, the step including immersing said objects in a heated bed of solid particles in pseudoliquid form.

5. In the opalizing of glass objects containing an opalizing ingredient, the steps including immersing said objects in a bed of solid particles in pseudoliquid form at a relatively low elevated temperature suitable for the rapid production of crystal nuclei of said opalizing ingredient and then raising the temperature of said objects to a relatively high elevated temperature suitable for the rapid growth of said crystal nuclei.

6. In the opalizing of glass objects containing an opalizing ingredient, the steps including immersing said objects in a first bed of solid particles in pseudoliquid form at a relatively low elevated temperature suitable for the rapid production of crystal nuclei of said opalizing ingredient, removing the objects from said first bed and immersing the objects in a second bed of solid particles in pseudoliquid form at a relatively high elevated temperature suitable for the rapid growth of said crystal nuclei.

7. In the production of glass objects colored by the presence of dispersed bodies of colloidal dimensions therein, the steps including immersing glass objects containing such color progenitor in a bed of solid particles in pseudoliquid form at a relatively low elevated temperature suitable for the rapid production of color nuclei of subcolloidal dimensions and then raising the temperature of solid objects to a relatively high elevated temperature suitable for the rapid agglomeration of said color nuclei.

8. In the production of glass objects colored by the presence of dispersed bodies of colloidal dimensions therein, the steps including immersing glass objects containing such a color progenitor in a first bed of solid particles in pseudoliquid form at a relatively low elevated temperature suitable for the rapid production of color nuclei of subcolloidal dimensions, removing the objects from said first bed and immersing the objects in a second bed of solid particles in pseudoliquid form at a relatively high temperature suitable for the rapid agglomeration of said color nuclei.

9. In the tempering of glass objects, the steps including heating said objects to a high annealing temperature and immersing said objects in a bed of solid particles in pseudoliquid form at a low temperature and then further cooling the objects to ordinary temperature.

10. In the tempering of glass objects, the steps including immersing said objects in a first bed of solid particles in pseudoliquid form at a high annealing temperature, removing the objects from said first bed and immersing the objects in a second bed of solid particles in pseudoliquid form at a low temperature and then further cooling said objects to ordinary temperature.

FREDERICK W. SULLIVAN, Jr.

References Cited in the file of this patent

UNITED STATES PATENTS

| Number | Name | Date |
|---|---|---|
| 170,339 | Brookfield | Nov. 23, 1875 |
| 208,207 | Shirley | Sept. 17, 1878 |
| 248,674 | Siemens | Oct. 25, 1881 |
| 343,133 | Leighton et al. | June 1, 1886 |
| 1,585,542 | Henry | May 18, 1926 |
| 2,132,390 | Blau | Oct. 11, 1938 |
| 2,203,182 | Rendall | June 4, 1940 |
| 2,292,684 | Blau | Aug. 11, 1941 |
| 2,339,975 | Blau | Jan. 25, 1944 |

FOREIGN PATENTS

| Number | Country | Date |
|---|---|---|
| 2,824 | Great Britain | Dec. 21, 1877 |
| 477,585 | Great Britain | Dec. 30, 1937 |